United States Patent [19]

Joannou et al.

[11] Patent Number: 4,506,309
[45] Date of Patent: Mar. 19, 1985

[54] TAPE DRIVE CALIBRATION METER

[75] Inventors: Kyriacos Joannou, Wayland; William P. Coots, West Bridgewater, both of Mass.

[73] Assignee: Pericomp Corporation, Natick, Mass.

[21] Appl. No.: 450,539

[22] Filed: Dec. 17, 1982

[51] Int. Cl.³ .......................... G11B 5/46; G11B 27/36
[52] U.S. Cl. ...................................... 360/137; 369/53
[58] Field of Search ........................ 360/26, 31, 75, 76, 360/137; 369/53, 54, 55, 56, 57, 58

[56] References Cited

U.S. PATENT DOCUMENTS 4,062,047 12/1977 Scull ...................................... 360/26

Primary Examiner—George G. Stellar
Attorney, Agent, or Firm—Wolf, Greenfield & Sacks

[57] ABSTRACT

A tape drive calibration meter that is adapted to display a number of calculated parameters for providing a numerical display of such conditions as skew, tape velocity, amplitude, and tape tracking. The tape drive calibration meter preferably has two inputs on two separate channels with each including an automatic gain control amplifier and a peak detector. Time interval measurement circuitry is coupled from the peak detector for carrying out measurements involving velocity and skew. After amplification, the detected signals on one of the channels are also transferred along a second path including a peak, follow and hold circuit and an analog-to-digital converter circuit with controls. Amplitude measurements and head positioning computations are taken by signals transferred along the second path to the peak, follow and hold circuitry and analog-to-digital conversion circuitry.

16 Claims, 18 Drawing Figures

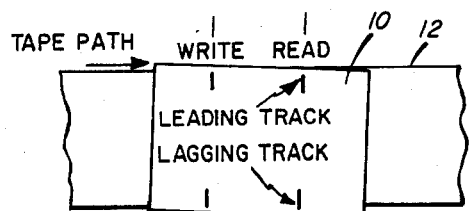
Fig.1A MECHANICAL SKEW
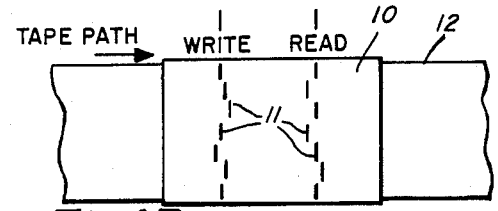
Fig.1B READ AND WRITE SKEW
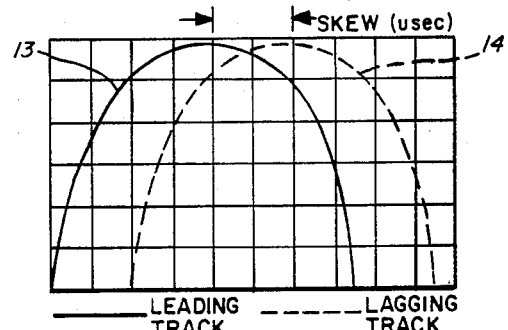
Fig.1C TYPICAL READ BUS SIGNALS WITH SKEW PRESENT
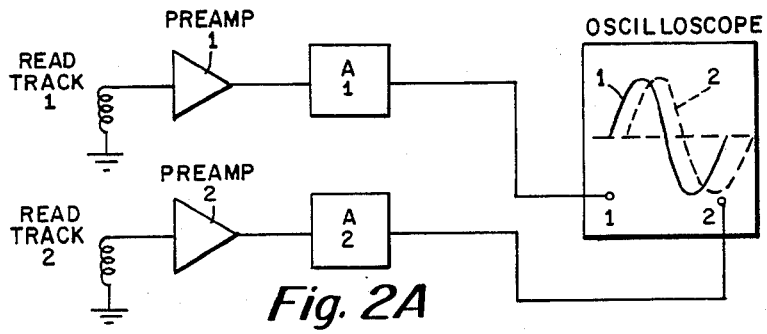
Fig. 2A
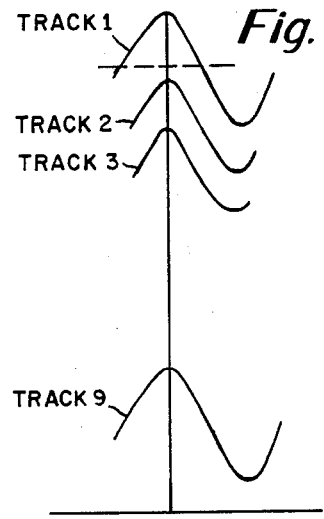
Fig. 2B
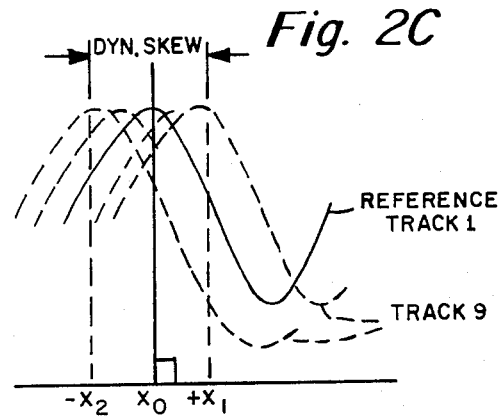
Fig. 2C

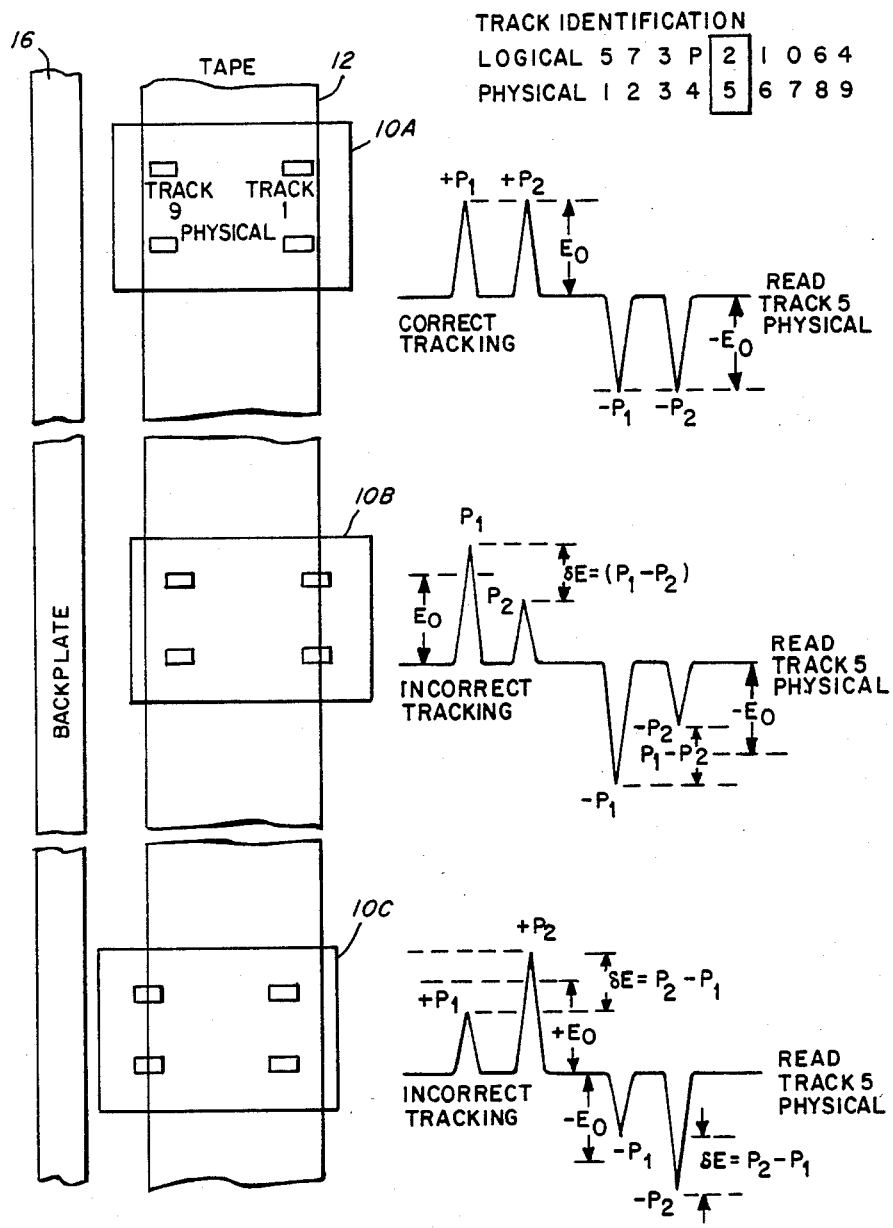

TAPE DRIVE CALIBRATION METER

BACKGROUND OF THE INVENTION

The present invention relates in general to a tape drive calibration meter and pertains, more particularly, to a digital display calibration meter for calibrating magnetic tape recording equipment to digitally display such parameters as azimuth head alignment (skew) and tracking.

Digital magnetic tape recording and readout equipment is extensively used as a computer peripheral for information interchange with the computer. In order to render the recording medium compatible with different tape drives, the tape drive, such as one handling the standard half inch magnetic tape, must have the capability of recording data at the prevailing data packing density and track spacing with sufficient accuracy. In particular, the recorded data has to be capable of being reliably recorded when the recording medium is read out on equipment other than that on which it was recorded. As packing densities increase, greater performance demands are placed on the equipment used for data recording as well as data readout. Present day commercially available equipment is supposed to be capable of producing recording medium that is compatible throughout the industry. However, the degree of compatibility depends largely on the calibration procedures, the equipment that is used, such as calibration tapes, and the accuracy of measurements of the parameters that are involved.

The degree with which compatability can be maintained between magnetic tape recording equipment depends upon the following parameters:

1. Azimuth alignment and gap scatter of magnetic recording-reproducing heads, usually measured by using a master head alignment tape or skew tape;
2. Accuracy of tracking or positioning of magnetic heads, usually measured by using a tracking or positioning tape;
3. Amplitude or gain adjustment of read amplifiers, usually measured by using a master output tape; and
4. Velocity and velocity variations of tape drives, usually measured by any one of several methods and a variety of different pieces of equipment.

Reference is now made to FIGS. 1-3 which illustrate further background with respect to present techniques used to measure the above parameters. These techniques generally require the use of calibration tapes and an oscilloscope to display the waveforms of the readout signals. FIG. 1 shows some of these signals while FIG. 2 illustrates the oscilloscope arrangement.

The azimuth alignment of a magnetic recording-reproducing head is a mechanical adjustment and is usually most readily achieved by the use of electronic measurements. FIG. 1A illustrates the mechanical skew that occurs between the magnetic head 10 and the tape 12 passing in the direction of the tape path illustrated in FIG. 1A. FIG. 1B illustrates a form of read/write skew in which the outside tracks are in proper orientation being perpendicular to the tape path but the individual tracks 11 are not in a straight line. FIG. 1C shows typical read bus signals with skew present. FIG. 1C illustrates a leading track in solid by curve 13 and a lagging track in dotted by curve 14.

FIG. 2 shows a prior art connection of read amplifiers along with an oscilloscope for displaying the waveforms of the outside tracks showing the skew or time difference between peaks which are being measured. FIG. 2B illustrates the proper position without skew in which all of the peaks align while FIG. 2C shows the signals from the outside tracks such as track 9 in comparison with the reference signal shown in solid as, for example, track 1. In the example that is given, the magnetic tape is considered as being a nine track tape for use with a nine track head. In FIG. 2C the track 9 is represented by dotted lines in different waveforms spread on both sides of the perpendicular line $X_0$. FIG. 2C illustrates the dynamic skew or jitter of the outside track about the reference which is to be measured with accuracy in order to align the head accurately. Visually, the extreme position of the positive peaks of the waveform are located at $(+x)$ and $(-x)$. These values can be added algebraically to obtain the average position of the head or average skew. Presently, these measurements typically yield poor results, prolonging the time required to accomplish head alignment.

FIG. 3 illustrates the tape tracking calibration. As in the skew tests, the tracking or head positioning test presently involves the reading of signals of the center track, measuring the amplitude of the two peaks, and calculating the mistracking of the head. FIG. 3 shows the tape 12 illustrating from a schematic standpoint, the backplate 16 and the head 10 in different positions identified as positions 10A, 10B, and 10C. In position 10A the head is in a correct tracking position as noted by the waveforms. Positions 10B and 10C illustrate the head in incorrect tracking positions. In position 10B the head must be moved toward the backplate 16 to correct the misalignment while in the position 10C the head must be moved away from the backplate 16 to correct the misalignment. Although this method of verifying and measuring tracking or head positioning is adequate, improved means are described in accordance with the present invention as discussed in detail hereinafter.

With respect to amplitude tests as presently taken, amplitude measurements and gain adjustments involve measurements of readout signals derived from a master signal level tape and displayed on an oscilloscope. With the use of the oscilloscope as illustrated in FIG. 2A, the reading of signals is quite difficult. For example, to read a signal on the order of 10 volts is quite difficult on an oscilloscope and it is most difficult to obtain accuracies any better than + or −5%. This is about the maximum limit of tolerance when gains are adjusted.

Generally, one of the last tests that is performed in the calibration procedure is the velocity of tape motion test. The velocity of tape motion is effected by mechanical tolerances of the capstan and the driving circuits of the capstan motor. Techniques for velocity measurements are somewhat undefined. There are several methods by which these measurements may be made. However, each method requires different types of equipment which are not of standard type and which are not readily carried by field service people in the field. As a result, velocity tests are rarely performed and when velocity problems develop in the field, the solution to these problems is generally very costly. Each method that is presently used for velocity measurement requires more than one piece of equipment and therefore the sources of error increase as a function of the multiplicity of pieces of equipment that are used.

For example, to measure the velocity of tape on a transport, it is necessary to first measure the diameter of the capstan by a mechanical device. The capstan is coated with some type of suitable rubber which is soft. Readings of the capstan periphery with a periphery gage can easily produce a 5% error which is twice the tolerance allowed for speed variation of the tape. Second, the revolutions per second of the capstan are measured in order to calculate the velocity of the tape. This measurement may be done optically with an optical tachometer or a mechanical tachometer which is required to be in contact with the shaft of the capstan motor. Either of these tachometer tools have inherent inaccuracies and when their error is multiplied by the error due to the diameter of the capstan, the net result may be intolerable. Therefore, these measurements have to be done several times to obtain an average reading. This makes the task time consuming in addition to being highly inaccurate.

Analysis of existing tape drive calibration techniques shows that the resolution of measurements taken on the oscilloscope varies depending upon the individual doing the test and the degree of his or her experience in the field. Also, the results of the calibration vary from one individual to another as well as the length of time it takes to complete the calibration.

Accordingly, it is an object of the present invention to provide a tape drive calibration meter which is adapted in essence to replace the presently existing oscilloscope reading technique and to instead display a number of different pertinent parameters on a readily readable digital display such as an LCD display.

SUMMARY OF THE INVENTION

To accomplish the foregoing and other objects of this invention there is provided a tape drive calibration meter that is adapted to display a number of calculated parameters for providing a numerical display of mechanical skew, dynamic skew or jitter, read/write skew, amplitude and velocity parameters. The tape drive calibration meter is adapted to have two inputs typically referred to as channel A and channel B inputs. Each of these input channels include an amplifier with automatic gain control, and a peak detector. The amplifier accepts low level analog signals from a read head of the tape drive, amplifies these signals by on the order of about ten. The amplifier has automatic gain control and the output of it is determined and adjusted to what is necessary for the various operations beyond the amplifier accomplished by the microprocessor. After amplification, the detected signal on one of the channels such as channel A is transferred along one of two possible paths, one of which includes the aforementioned peak detector where the analog signal (sine wave) is converted to a square wave or a digital pulse. Such digital pulses from both channels couple to time interval measurement circuitry and the output of this circuitry in turn couples to a databus of the microprocessor. The second path from the amplifier is to analog circuitry including, for example, a peak follow and hold circuit and analog-to-digital converter circuit. Signals for time measurement such as static skew, velocity, dynamic skew, inter-record skew gap and time symmetry are directed along the first path into the aforementioned time interval measurement circuitry. For amplitude measurements and head positioning computations, the signals taken after the amplifiers are directed along the second path which includes the peak follow and hold circuitry and the analog-to-digital conversion circuitry.

BRIEF DESCRIPTION OF THE DRAWINGS

Numerous other objects, features and advantages of the invention should now become apparent upon a reading of the following detailed description taken in conjunction with the accompanying drawing, in which:

FIGS. 1A–1C schematically illustrated skew problems, common in the field;

FIGS. 2A–2C illustrate a prior art connection of read amplifiers and an oscilloscope along with associated waveforms;

FIG. 3 illustrates tape tracking and shows associated waveforms for correct and incorrect tracking conditions;

DETAILED DESCRIPTION

Figure 4:
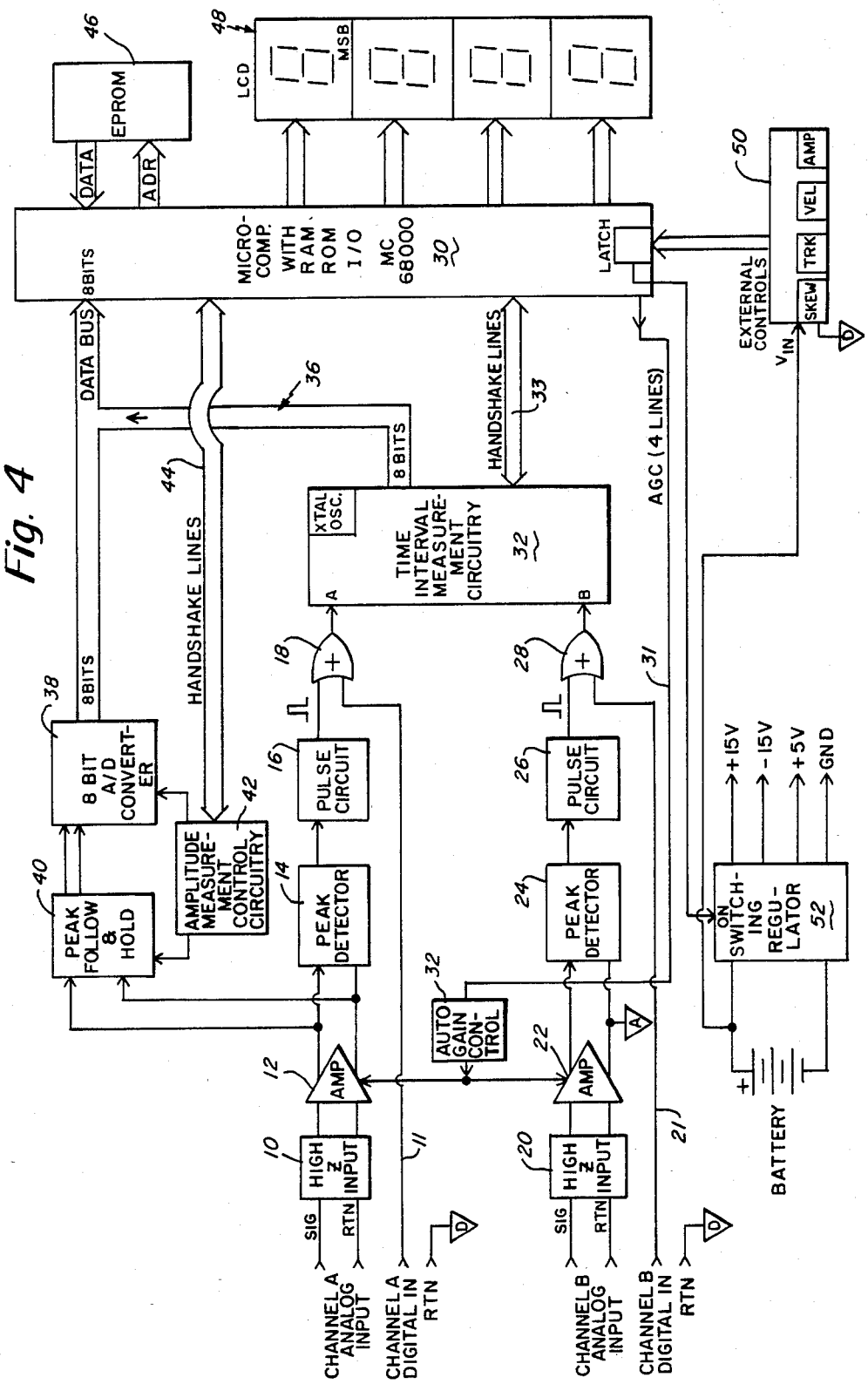
FIG. 4 is a block diagram of the tape drive calibration meter of the present invention.

In the background described hereinbefore, reference has been made to FIGS. 1–3 in illustrating skew and tracking problems and also illustrating such as in FIG. 2, the previous manner in which calibration was carried out. Now, reference is made to the block diagram of FIG. 4 which illustrates the tape drive calibration system of the present invention. FIG. 4 is to be described also in connection with the detailed diagrams illustrated in FIGS. 5–12 which show specific detail of one preferred system constructed in accordance with this invention. In accordance with the present invention, the calibration meter is adapted to replace the oscilloscope and the manual measurements and computations that were previously necessary.

FIG. 4 illustrates the block diagram of the system including two input channels A and B. These channels may be associated respectively with the outside tracks, namely, tracks No. 1 and No. 9. The first channel may be referred to as a reference channel and the second is the select channel. With respect to channel A, there is provided a high input impedance circuit 10 which in turn couples to amplifier 12. The output of amplifier 12 couples along a first path to the peak detector 14, the pulse circuit 16, and OR gate 18.

The channel B has similar circuitry including the high input impedance circuit 20, amplifier 22, peak detector 24, pulse circuit 26, and OR gate 28. FIG. 4 also shows the microcomputer 30 which has four AGC (automatic gain control) lines 31 coupling therefrom by way of the automatic gain control 32 to the amplifiers 12 and 22. As will be described in further detail hereinafter, the microcomputer 30 is adapted to control the gain of the amplifiers 12 and 22 during a test sequence so as to essentially normalize amplitude levels.

FIG. 4 also illustrates digital inputs to the system. These are used when the tape drive equipment provides such digital signals therefrom. In this case, the digital input of the channel may be used instead of the analog input in which case the digital input is coupled directly to the OR gate such as OR gate 18 for channel A and OR gate 28 for channel B. The channel A digital input is shown on line 11 while the channel B digital input is shown on line 21. Line 11 couples to a second input of the gate 18 while line 21 couples to a second input of the gate 28. Actually, the input digital signal couples by way of detection circuitry not illustrated in FIG. 4 but shown in detail and described in detail hereinafter in connection with FIG. 6.

Although in FIG. 4 there is shown a system in which the digital input is coupled to the system separately from the analog input, in a preferred embodiment to be described in detail hereinafter, the digital inputs are at the same input as the analog tape signal. A switch is then set by the user of a calibration meter to select either digital or analog inputs.

In connection with FIG. 4, reference may also be made to FIG. 3 described hereinbefore and in particular to the waveforms illustrated therein. In this connection, the peaks P1 and P2 are part of the tracking signal and are found on the center track. These signals are inputted into channel A only with channel B not being used for tracking measurements. In FIG. 4 the channels A and B at the outputs of the OR gates 18 and 20 are shown coupling to the A and B inputs of the time interval measurement circuitry 32. It is noted that there are also provided, handshake lines 33 coupled between the microcomputer 30 and the circuitry 32, and there is also a connection to the data bus 36. It is noted in FIG. 4 that the data bus 36 also intercouples between the microcomputer 30 and the 8-bit A to D converter 38.

The input analog signal, such as the one at channel A is coupled by way of the high input impedance circuit 10 to the amplifier 12. The amplifier 12 has automatic gain control and has its output determined and adjusted to that which is necessary for the various operations beyond the amplifier by the microprocessor. After the amplifier 12, the signal may be transferred along one of two paths. The first path includes the aforementioned peak detector 14, pulse circuit 16, and OR gate 18. The second path from the amplifier 12 couples to analog circuitry including the peak follow and hold circuit 40 and associated amplitude measurement control circuitry 42. FIG. 4 shows the general interconnections between the analog circuitry. Reference will be made hereinafter to the specific circuitry for each of these circuits. It is noted in FIG. 4 in connection with the circuitry 42 that handshake lines 44 interconnect therefrom to the microprocessor 30.

FIG. 4 also illustrates the eprom 46 and the display 48 which is preferably a four-digit seven-segment display. The display 48 may be a liquid crystal display. FIG. 4 also illustrates the external controls 50 and the linear power supply 52. Further details of the controls 50 and the supply 52 are described in connection with FIGS. 11 and 12, hereinafter.

In connection with FIG. 4, signals for time measurement are directed through the first path into the time interval measurement circuitry 32. For amplitude measurements and head positioning computations, the signals after the amplifier 12 are directed to the second path including the peak follow and hold circuit 40. The signals for time measurement include static skew, velocity, dynamic skew, inter-record skew gap, and time assymmetry.

Figure 5:
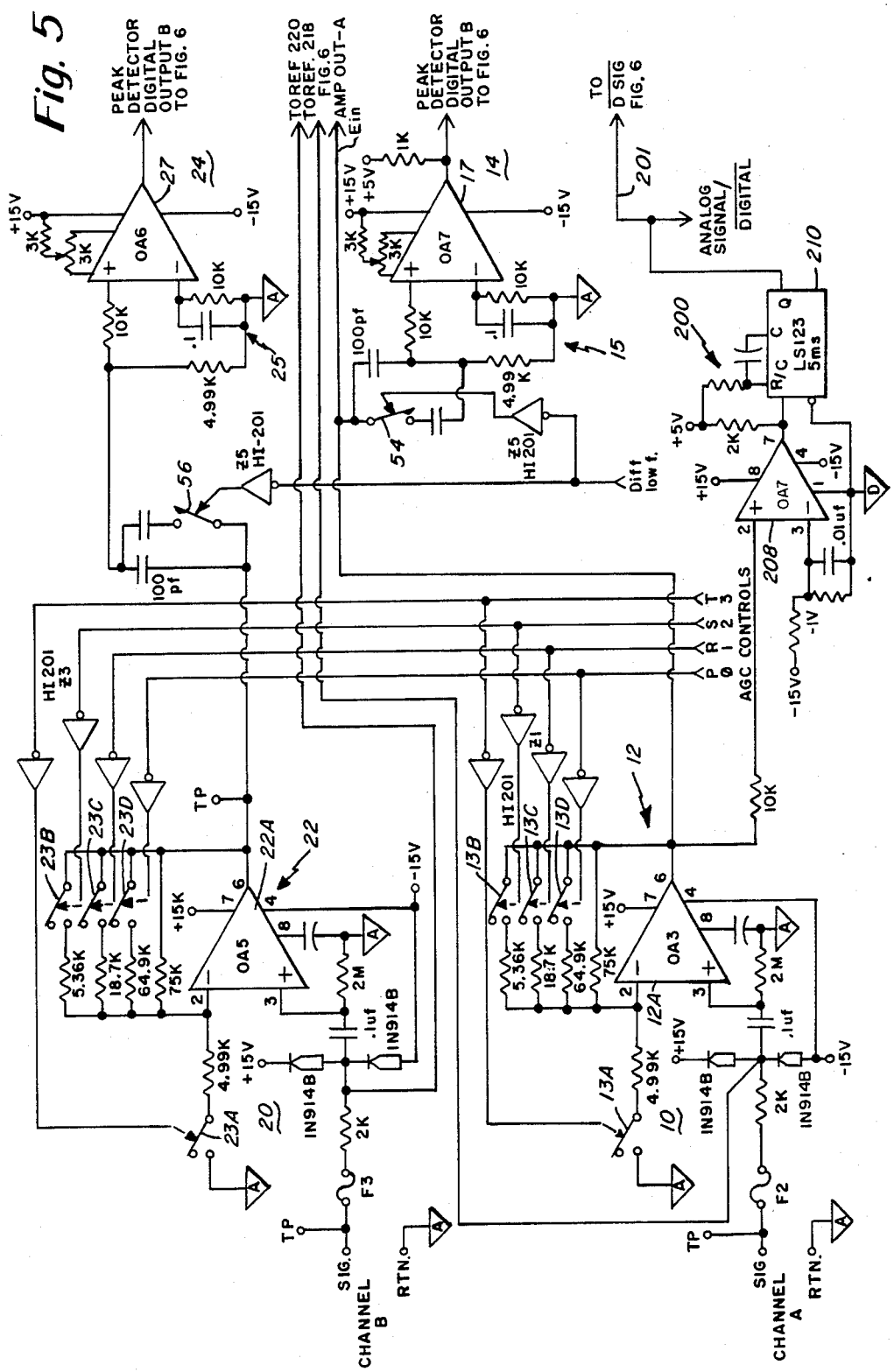
FIG. 5 is a detailed circuit diagram showing part of the system of FIG. 4 including the input amplifier and peak detector and illustrating both channels A and B.

FIGS. 5-12 now show further specific details of the system illustrated in FIG. 4. FIG. 5 shows the input sections of the channels A and B. The signal input line and signal return line a channel A couple to the amplifier 12. The amplifier 12 includes an operational amplifier 12A. The signal return line couples to the negation input of the amplifier 12A by means of a first analog switch 13A. There are also provided three other analog switches 13B, 13C and 13D. The control for each of these analog switches is from respective signal terminals P, R, S, and T. In this connection note the microcomputer 30 and the four associated outputs therefrom identified as signals P, R, S, and T, all of which are for providing automatic gain control. In FIG. 5 these same signals also couple to the analog switches 23A, 23B, 23C and 23D associated with the operational amplifier 22A of amplifier 22. These gain control signals from the microcomputer 30 control the gain of each of the operational amplifiers so as to maintain to gain thereof within a relatively narrow standard range of outputs so as to provide voltage levels consistent with that desired in the remainder of the circuitry such as in the peak detectors and digital pulse circuitry.

In FIG. 5 there is shown a first path which couples to the peak detector 14 and a second path which couples by way of line 53 to the peak follow and hold circuit 40. In this connection, note the input line 53 to FIG. 10 referred to as the $e_{in}$ signal. As indicated, the signal from amplifier 12 along the first path is coupled to a peak detector which includes a differentiator 15 and an analog voltage comparator 17. The differentiator 15 differentiates the sinusoidal waveform at the output of the amplifier 12 effectively changing the phase thereof by 90°. In this way a peak becomes a zero crossing at the output of the differentiator. The analog comparator 17 and associated components simply take the phase changed waveform and function as a zero crossing detector, so that the output switches from low to high, or high to low when the differentiated signal is at zero volts. This transition lines up with the input signal peak. This output signal is the peak detector digital output signal for channel A and couples to the circuitry of FIG. 6 including the pulse circuit 16 which includes a pair of monostable multivibrators or one-shots 16A and 16B.

FIG. 5 also shows an additional capacitor 54 which is switched in at low velocities. This is needed to keep the amplitude of the differentiated signal at a usable level. Without the additional capacitor the amplitude gets too low and may develop erroneous askew readings.

Figure 6:
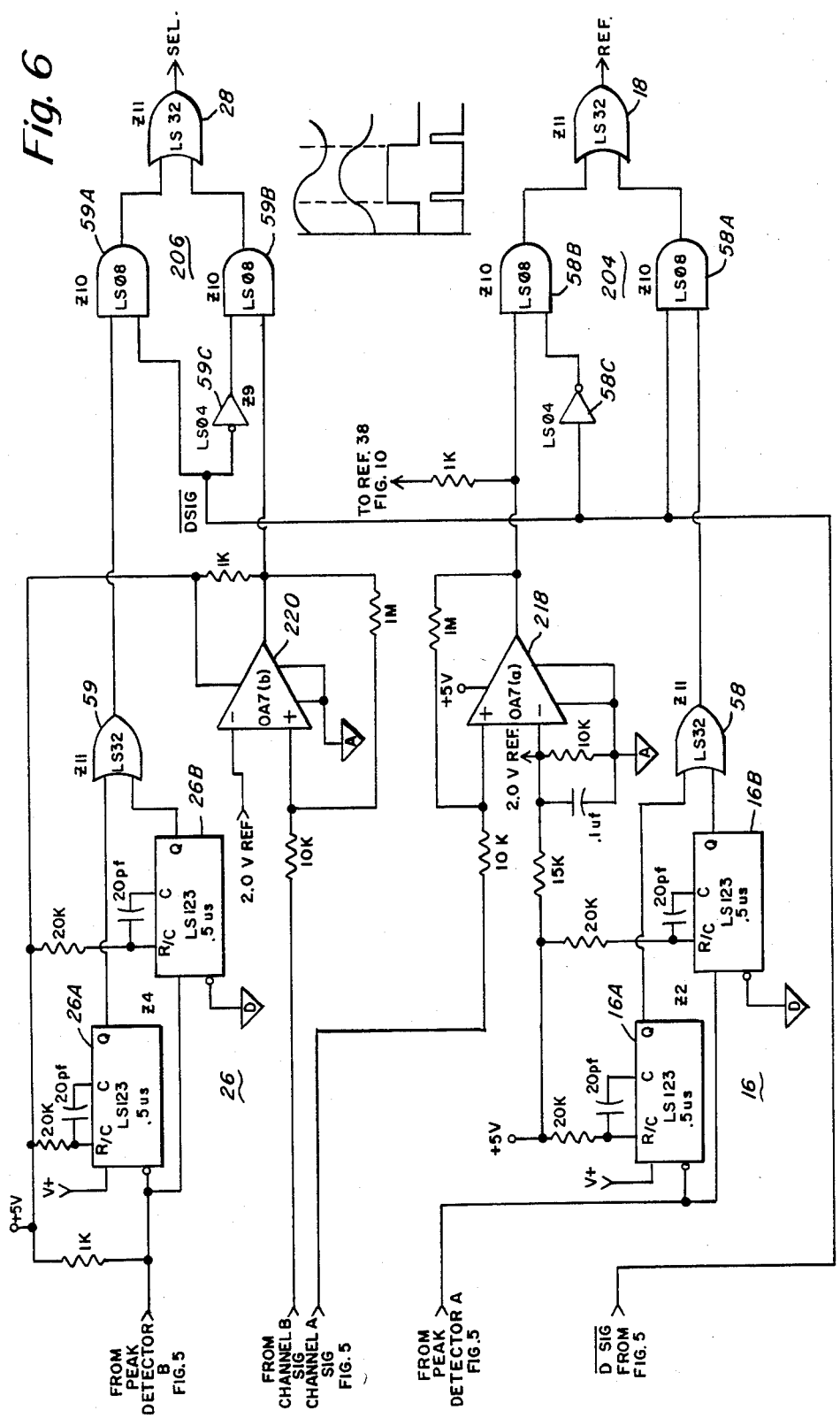
FIG. 6 is a detailed circuit diagram of the output circuitry from the peak detectors including pulse and logic circuits.

The circuitry associated with channel B is substantially the same including a peak detector 24 which comprises the differentiator circuit 25 along with the analog voltage comparator 27 couples to the pulse circuit 26 shown in FIG. 6. The pulse circuit 26 includes the 0.5 microsecond one-shots 26A and 26B. In FIG. 5 each of the differentiators is of standard construction including a series capacitor and a parallel resistor. The driver circuit of the pairs of transistors in FIG. 5 is also a conventional current boosting driver circuit. Also, in FIG. 5 the automatic gain control is brought about by inserting different combinations of resistors in the feedback loop of the respective operational amplifiers 12A and 22A. This is all under control of the computer as mentioned hereinbefore and as to be described in further detail hereinafter.

Thus, in the circuitry of FIG. 5 the sinusoidal waveform has been shifted and has been squared. FIG. 6 illustrates by the waveforms shown therein, the input sinusoidal waveform, the shifted waveform, and the squared waveform. The final waveform illustrated in FIG. 6 shows the generation of the pulses which is accomplished by the pulse circuits 16 and 26. It is noted that pulses occur in association with both the peak of the positive part of the sinusoidal waveform as well as the peak of the negative portion of the waveform. It is for that reason that there are provided a pair of one-shots, one of which triggers on the positive transition and the other one of which triggers on the negative transition. Both of these 0.5 microsecond pulses from the one-shots are OR'ed by the OR gates 58 and 59. The output of the OR gate 58 couples to the aforementioned gate 18 via gate 58A while the output of the OR gate 59 couples to the aforementioned OR gate 28 via gate 59A. FIG. 6 identifies the respective outputs from the gates 18 and 28 as the reference and select signals. These are the two signals coupled to the timer interval measurement circuitry 32 shown in FIG. 4 and illustrated in detail in FIGS. 7 and 8.

FIG. 6 also shows circuitry that is used so that one input may be employed for both the digital and analog signal inputs. Although in the block diagram of FIG. 4 the digital input at lines 11 and 21 is shown as a separate input, it is noted in the circuitry of FIG. 6 that the output of amplifier 12 couples to a detection circuit 200, the output of which at line 201 is the signal DSIG— used for controlling the logic circuit 204 and a like logic circuit 206. The circuit 200 includes an operational amplifier 208 and a one-shot 210. This circuitry is used to discriminate between a digital signal at the input and an analog or sign wave type signal at the input. For an analog type signal, the output of the amplifier is symmetrical about ground. However, for a digital pulse input, the signal at the output of the amplifier is primarily positive and goes only slightly below ground. Thus, for an analog signal, the one-shot 210 is triggered to a high level output indicative of an analog signal or DSIG—. This high level signal couples to circuits 204 and 206 for enabling the respective gates 58A and 59A and disabling the respective gates 58B and 59B.

In accordance with another embodiment of the present invention, the circuit 200 may be substituted by the use of a switch to mechanically select either a digital input or an analog input. The switch output (high or low) will then become the signal AN/DIG— signal.

With respect to the circuit 200, the input signal is coupled to the operational amplifier 208 which is actually connected as a comparator whereby the input analog signal is compared with a 2.0 VDC reference imposed on the negative input terminal of the device 208. If the input signal is greater than 2.0 volts, the output of the comparator goes to its high state. On the other hand, when the input signal goes below 2.0 volts, the comparator output goes low. If the input signal is a digital signal, a low will be put onto the DSIG— input and the output of the comparator, such as comparators 218, 220, pass the digital signal directly to the respective gates 58B, 59B and to the output gates 18 and 28. Thus, for the case of an input digital signal, much of the circuitry illustrated is by-passed and need not be digitized. Furthermore, the arrangement that is described either in analog or digital input can be connected and is so interpreted primarily by the circuit 200 to determine the routing of signals.

If the input signal is an analog signal, then the signal DSIG— is high and the outputs from the comparators 218 and 220 are blocked. In that case the signals coupled from the respective gates 58 and 59 to gates 58A and 59A and from there to the output OR gates 18 and 28.

Figure 7:
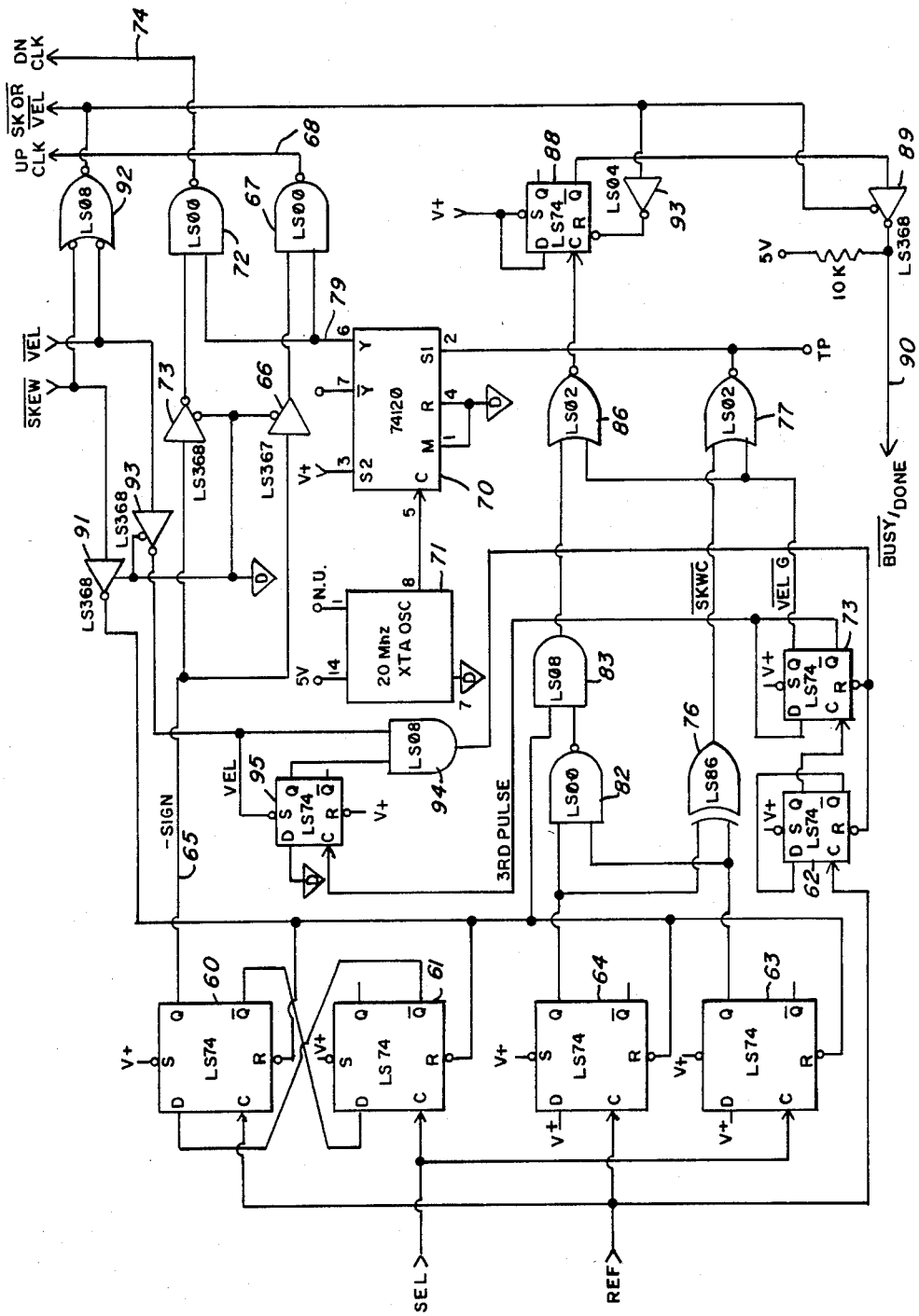
FIG. 7 is a detailed circuit diagram of the time interval measurement circuitry illustrated in FIG. 4.
Figure 8:
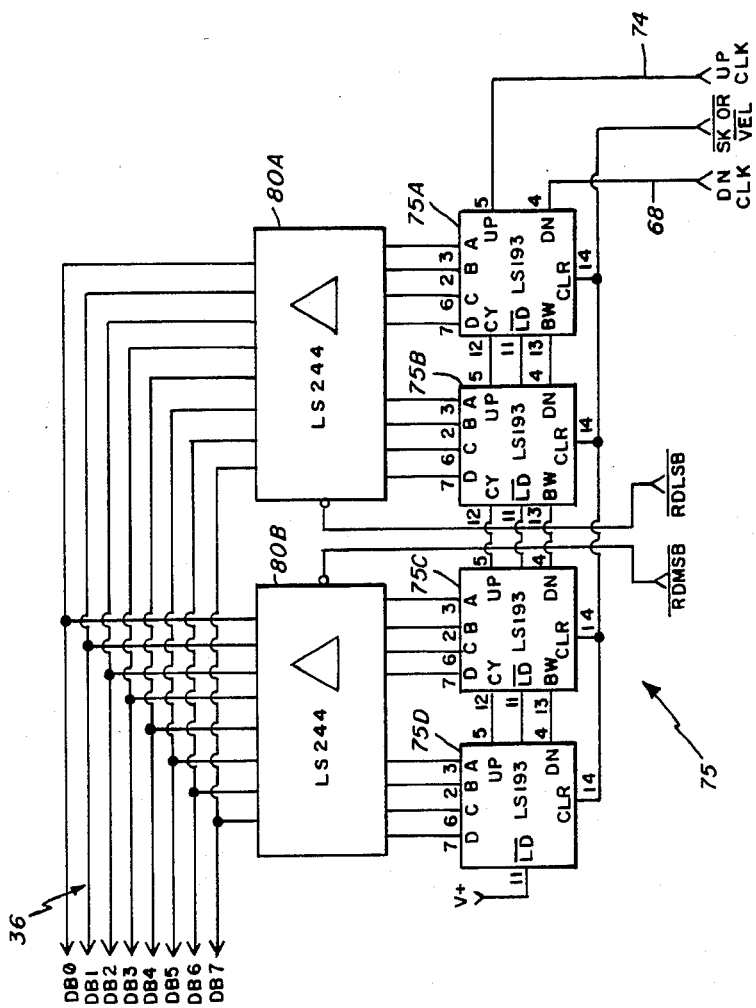
FIG. 8 is a circuit diagram of the up/down counter associated with the circuitry of FIG. 7.

FIG. 7 shows most of the control circuitry of the time interval measurement circuitry 32. FIG. 8 primarily shows the counter of the circuitry 32. In FIG. 7 it is noted that there are provided the reference select inputs. The reference input couples to the clock input of flip-flop 60 and also couples to the clock inputs of the flip-flops 62 and 64. The select input couples to the clock input of flip-flops 61 and 63. The cross-coupled flip-flops 60 and 61 are used primarily for determining the phase between the reference and select signals. In particular, the output at line 65 from the assertion side of the flip-flop 60 has its logic level indicate whether the reference signal is before or after the select signal. When the input to the flip-flop 60 occurs first, the assertion output thereof is high in this high level signal on line 65 couples by way of gate 66 to NAND gate 67 for enabling gate 67 and providing down clock pulses on the output line 68. These pulses arrive from the pulse synchronizer 70. It is noted that the clock input from the synchronizer 70 is from a crystal oscillator 71. The synchronizer 70 is to assure that only full clock pulses are coupled to the mutually exclusively enabled gates including gate 67 and the second NAND gate 72. In the event that the select signal comes before the reference signal, then the output on line 65 is at its low level and this signal is passed by way of an inverter 73 to enable the NAND gate 72 so as to provide up clock pulses on line 74. FIG. 8 shows these same lines 68 and 74 coupling to the up/down counter 75 illustrated in FIG. 8. It is noted in FIGS. 7 and 8 as well as the other specific circuitry described herein, that each of the electronic components is identified by an LS number. For example, the flip-flops 60 and 61 are of type 74 LS 74. All gates and other electronic components are also similarly identified.

In addition to determining the direction of skew, one must also determine the magnitude of the skew. In this regard, the flip-flops 63 and 64 are instrumental in measuring the actual skew or time difference. In this connection, refer to the aforementioned FIG. 1 and in particular, FIG. 1C which shows the leading and lagging track waveforms representative of the skew problem.

It is noted that the flip-flop 64 is clocked from the reference input along with flip-flop 63 is clocked from the select input. The time measurement is determined by the time during which one of the flip-flop has been clocked and prior to the clocking of the second one. To detect this, there is provided an exclusive OR gate 76 which has two inputs coupled from the respective assertion inputs of the flip-flops 63 and 64. In accordance with the logic carried out by the gate 76, there is a high output therefrom when either of the inputs is high but not when both are high. The gate 76 thus has the effect of providing a window, the width of which is representative of the time difference to be measured. This pulse width signal coupled to one input of the OR gate 77. The output of the gate 77 couples by way of inverter 78 to the aforementioned clock synchronizer 70. The device 70 as indicated in FIG. 7 is of type 74120. As indicated previously, the clock input to the device 70 couples from a 25 MHz crystal oscillator 71. The output from the device 70 at line 79 couples to the gates 67 and 72 for providing clocking through these gates. The input to the device 70 from inverter 78 controls the period over which the clock pulses at the clock input to the device 70 are essentially passed to the output line 79. Again, the number of clock pulses that are passed are a function of the width of the window as measured by the gates 76–78 and representative of the time difference between the occurrence of the clocking of the flip-flops 63 and 64 from the respective input lines illustrated in FIG. 7. Accordingly, there are provided on the output lines 68 and 74, a series of pulses on a mutually exclusive basis which pulses are used to clock up or clock down the up/down counter 75 illustrated in FIG. 8. FIG. 8 shows the counter as comprising four separate stages 75A–75D, each of type 74 LS 193. Associated with each of these stages is a pair of output drivers 80A and 80B. Address to coding signals noted in FIG. 8 are used for addressing or enabling each of these drivers for respective decoding of the most and least significant bits. The up/down counter 75 illustrated in FIG. 8 is reset as noted in FIG. 8 by a signal indicating that one is not in the skew or velocity measurement state.

In FIG. 7, associated with the flip-flops 63 and 64, is a NAND gate 82 which also receives both assertion outputs of the flip-flops. This gate is for detecting the termination of the window or when both of these inputs have gone high. Under that logic condition, the output of the gate 82 is at its low level, thus providing a high level output at the output of gate 83. This high level signal is inverted by inverter 84 to provide a low level input to the OR gate 86. This signal is coupled to the inverter 87 for causing a positive going input signal to the clock input of the flip-flop 88 causing this to clock providing a low output to the inverter 89 which is inverted to a high output at the line 90 indicating that the skew sensing is DONE (BUSY—). The signal on line 9 will be referred to hereinafter and is used for control in association with the microcomputer 30.

FIG. 7 also illustrates the signals SKEW and VEL (velocity). It is noted that the SKEW— signal is coupled by way of inverter 91 to the reset inputs of the flip-flops 60, 61, 63 and 64 and also into the gate 83. When the SKEW sequence is over, the output of the gate 91 goes low resetting the flip-flops because the SKEW operation has now been completed and this also disables the gate 83 preventing any reclocking. It is also noted that the SKEW— and VEL— signals couple to the gate 92. This gate along with the inverter 93 provide for resetting of the flip-flop 88 at the termination of either the SKEW or VELOCITY measurements.

Now, for VELOCITY measurements, only one track is necessary to obtain a reading. In accordance with one sequence of operation, the clock or counter is turned on by a first pulse out of the peak detector and turned off by say, a third pulse therefrom. This time equals the duration of one cycle. From a clock pulse is counted by the counter, the central processor computes the frequency and determines the velocity of tape motion and furthermore displays the result in inches or centimeters per second. This display occurs on the display 48. It is noted that the input signal to the peak detector is derived from a precision pre-recorded tape with a known frequency such as a tape having a frequency at 800 bits per inch with all ones being continuously recorded. With reference to FIG. 7, the velocity measurement involves the signal VEL. It is noted that the signal VEL— is coupled by way of an inverter 93 to an AND gate 94. This circuitry includes reset circuitry for the flip-flops 62 and 73. This reset circuitry also includes a flip-flop 95. The flip-flop 95 is eventually clocked from the negation output of the flip-flop 73 to provide control for resetting the flip-flops 72 and 73.

The flip-flops 62 and 73 form in a sense, a counter that is for measuring one cycle in order to derive a velocity of tape measurement. As mentioned previously only one track need to be sensed, and in this case it is noted that the reference input is coupled to the clock input of the flip-flop 62. The flip-flops 62 and 73 are each interconnected in a cross-coupled manner whereby the gate 77 has a high input from the assertion output of the flip-flop 73 for a period of time from the commencement of the first pulse that in sequence clocks the two flip-flops until the occurrence of a third reference pulse which changes the state of the flip-flop 73 so as to in a sense terminate the window or high level signal to the gate 77. The device 70 thus has a series of output pulses coupled to either the up/down input of the counter 75 with the number of pulses being interpretable as a velocity measurement. This measurement is indicated on the databus 36 by a binary code.

At the end of the velocity sequence, the flip-flops 62 and 73 are reset. It is also noted that once the flip-flop 73 has changed state, the low level output from the assertion output of the flip-flop couples by way of gates 86 and 87 to again clock the flip-flop 88 indicating that the velocity sequence has terminated. This signal is on line 90.

Amplitude measurements are made on one track at a time by passing this signal through a peak, follow and hold circuit 40 illustrated in FIG. 4. The output therefrom is fed to an analog-to-digital converter 38 also illustrated in FIG. 4. This provides a digital signal representative of the value of the amplitude of the signal. As indicated in FIG. 4, this signal is coupled to the microprocessor 30 for conversion to numerical form for display on the display device 48.

Figure 9:
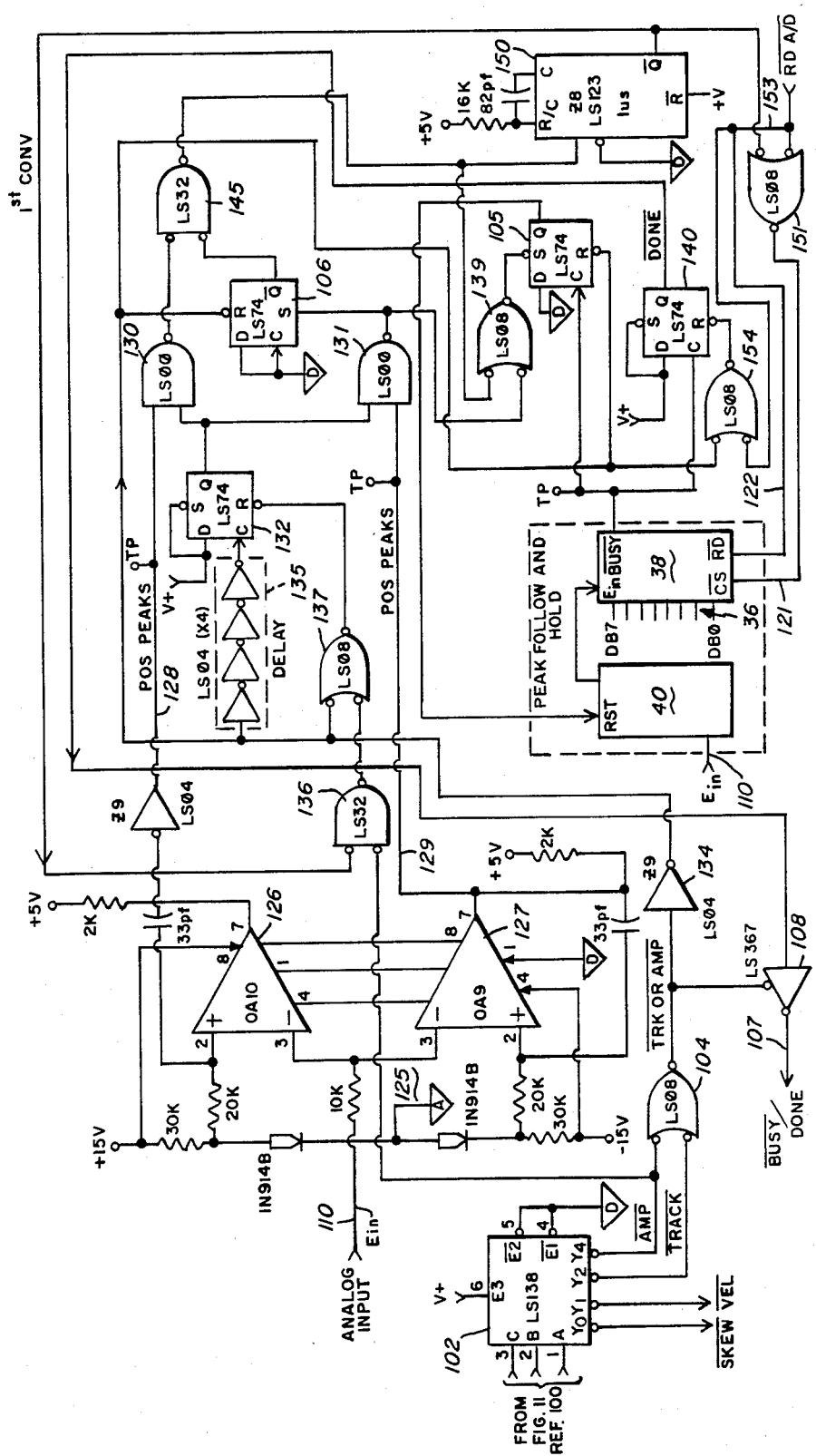
FIG. 9 is a detailed circuit diagram of the amplitude measurement control circuitry illustrated in FIG. 4.
Figure 10:
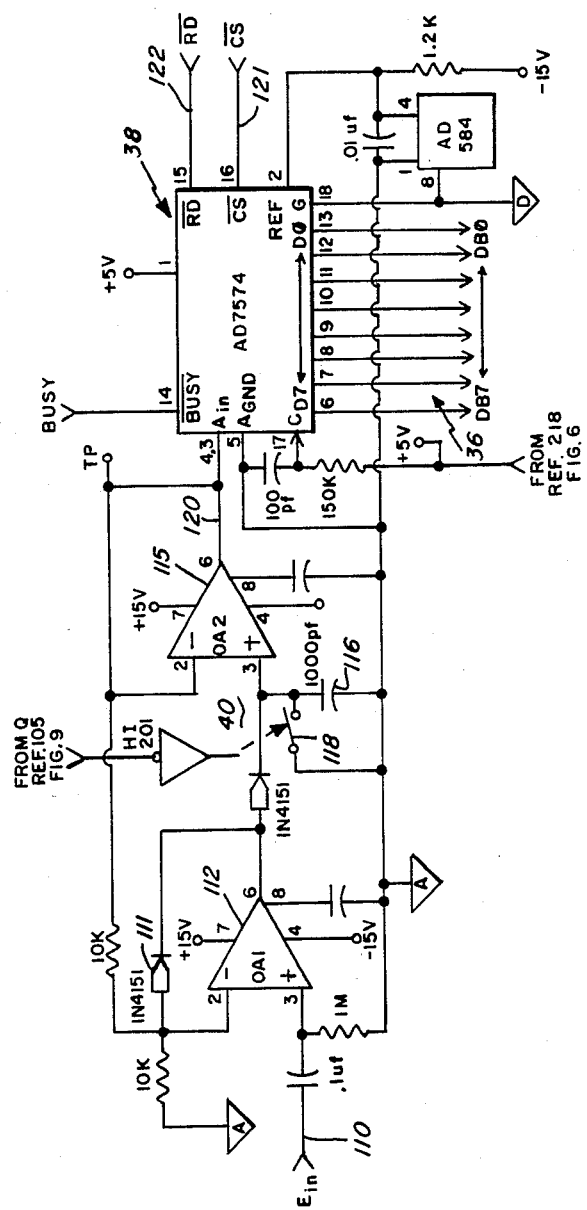
FIG. 10 is a circuit diagram illustrating the peak, follow and hold circuit of FIG. 4 and also the analog-to-digital converters illustrated in FIG. 4.

FIGS. 9 and 10 illustrate further specific detail of the portion of the circuitry illustrated in FIG. 4 including the circuit 40, the converter 38, and a control circuitry 42. FIG. 9 illustrates the overall circuitry while FIG. 10 shows details of the peak, follow and hold circuit 40 and the analog-to-digital converter 38. The circuit 40 and the converter 38 are also illustrated in the more block form in FIG. 9.

Figure 11:
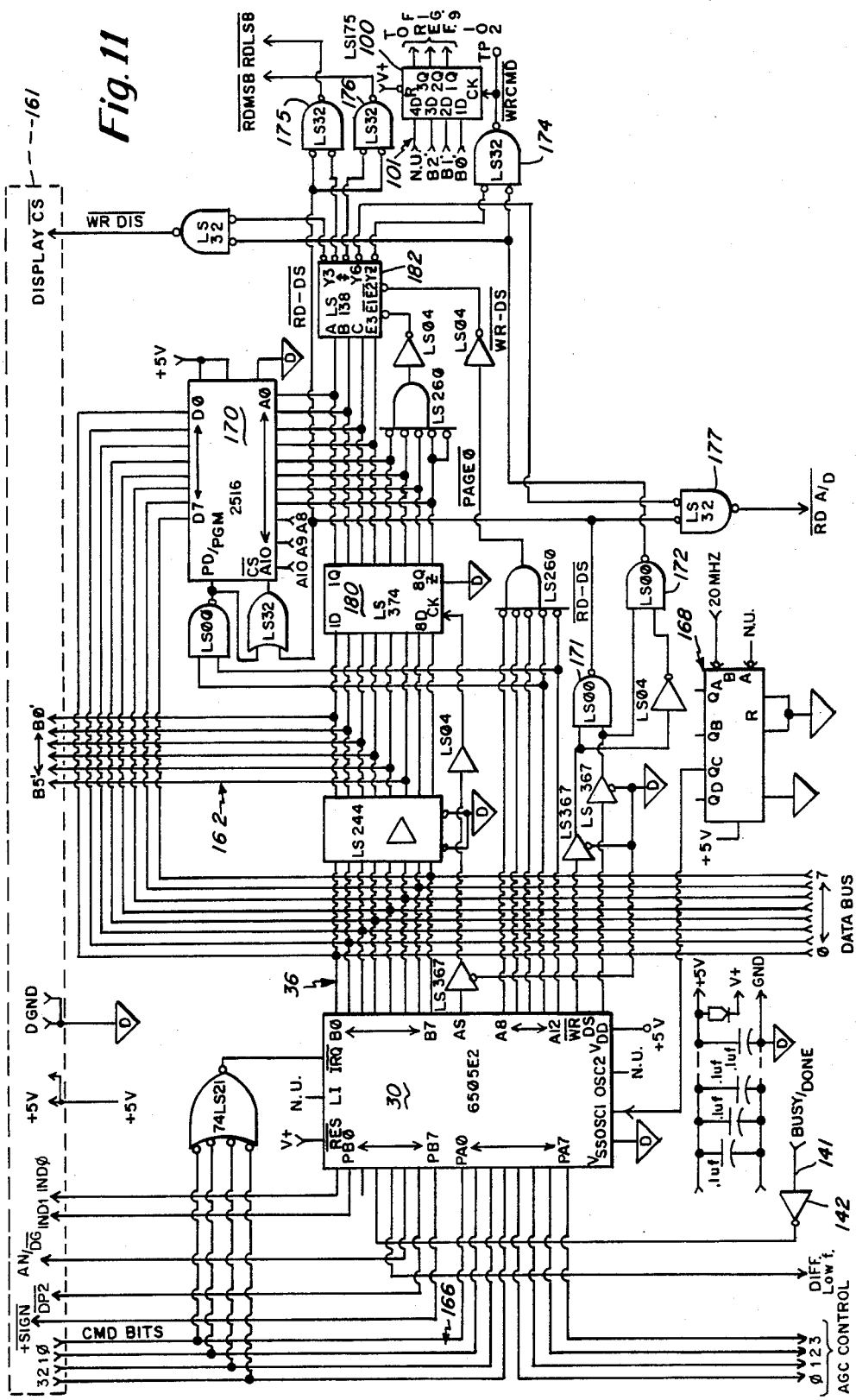
FIGS. 11 and 12 illustrate further details of the microcomputer and associated controls.
Figure 12:
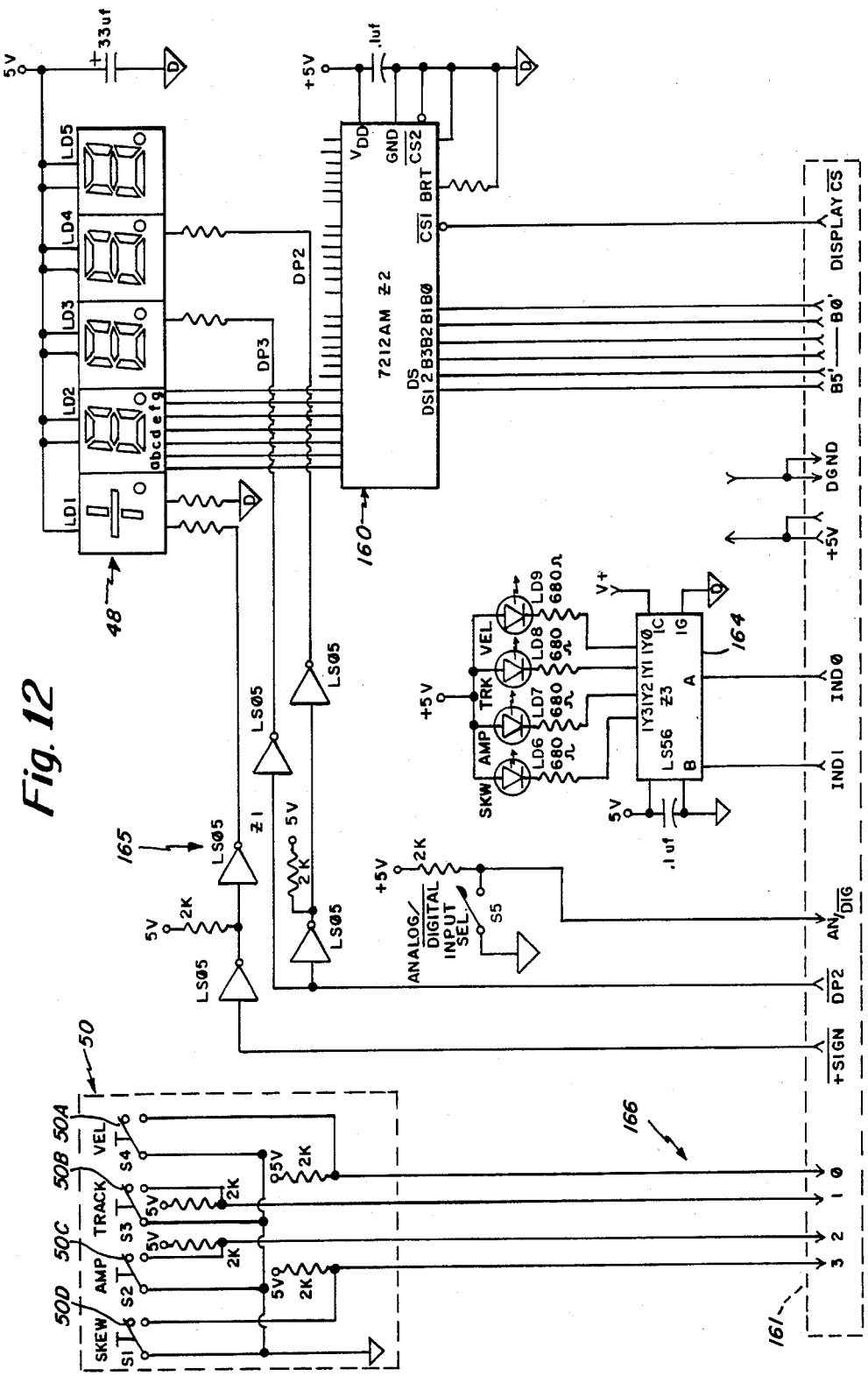

Reference is also now made to FIGS. 11 and 12 which illustrate the command latch 100 which receive function codes on lines 101 and generate command signals identified as signals E, F and D. These corresponding command signals are also illustrated in FIG. 9 coupling to the decoder device 102. It is the device 102 that provides the signals for velocity, skew, tracking, and amplitude. The velocity and skew signals have been discussed previously in connection with FIGS. 7 and 8. The track and amplitude signals are instrumental in the control of the circuitry of FIG. 9. It is noted in FIG. 9 that the TRACK— and AMP— signals couple to the gate 104. If one is neither in the track nor in the amplitude state and the output of the gate 104 is at its high state, maintaining flip-flops such as flip-flops 105 and 106 reset and also disabling the line 107 at the inverter 108. If either the track or amplitude state is decoded, then the output of the gate 104 goes low enabling the inverter 108 and removing the holding reset on the flip-flops.

FIG. 9 shows the analog input at line 110. This is the signal taken from line 53 referred to hereinbefore as path 2 in FIG. 5. This is taken directly from the output of the input amplifier circuit including the operational amplifier 12A in FIG. 5. This signal couples to the peak, follow and hold circuit 40 in FIG. 9. Reference is now made to FIG. 10 which shows further detail of the circuit 40. The input analog signal couples to an operational amplifier 112 whose output couples by way of analog switch 114 to a second operational amplifier 115. It is also noted that the output of the analog switch couples to the main storage capacitor 116. For discharge of the storage capacitor 116 there is provided a second analog switch 18. The analog switch 114 is controlled from the signal DET— while the analog switch 118 is-controlled from the signal RST—. These signals are generated in the control circuitry of FIG. 9 and are discussed in more detail hereinafter. The detection signal simply permits a charging of the capacitor by closure of the analog switch 114. Thereafter, after an amplitude reading has been taken, the analog switch 118 closes and the analog switch 114 will open. The closing of the analog switch 118 causes a rapid discharge of the storage capacitor 116 readying this capacitor for further action upon detection of a further peak. It is noted in FIG. 10 that there is provided a diode 111 across the operational amplifier 112. This clips the negative portion of the waveform and thus the signal that is passed to the capacitor is one that provides for a charging thereof until the peak of the signal is reached. The storage capacitor then maintains the peak that is reached until such time as the control provides for discharge thereof.

FIG. 10 also shows the analog-to-digital converter 38 and its associated connection to the databus 36. The analog input to the converter 38 is at line 120. The control, to be discussed hereinafter in connection with FIG. 9 controls other signals to the converter 38 such as the chip selection signal at line 121 and the read signal at line 122. The timing control is such that the peak signal is to be read at the proper time when the peak has in fact been reached and these control signals are generated so as to carry out the proper reading of the analog signal at its peak.

In FIG. 9, it is noed that the input analog signal at line 110, in addition to coupling to the peak, follow and hold circuit 40, also couples to the detection circuit 125 which includes operational amplifiers 126 and 127. The circuit 125 is of conventional design and is not discussed in detail herein. Positive output pulses are coupled from the circuit on line 128 and negative pulses on ine 129. In this connection reference is also made to the previously discussed FIG. 3. The positive and negative pulses that are referred to correspond with those illustrated in FIG. 3. The need for detecting positive and negative pulses is so that the same pulse is sensed each time. In other words, the circuitry is set up so that it is the first positive pulse that has its amplitude sensed. If pulses were chosen indiscriminately, then at one time, one of the positive pulses could be sensed and at another time, one of the negative pulses. To remedy this, control circuitry is provided so that each time the first positive pulse is sensed. In this way, the proper amplitude comparisons and amplitude calibration can be carried out.

The output lines 128 and 129 from the circuit 125 couple to respective NAND gates 130 and 131. When the gates 130 and 131 are enabled from the flip-flop 132, then a low output on the gate 130 is indicative of positive pulses and a low output on the gate 131 is indicated of negative pulses. It is noted that the indication of positive pulses forms the detection signal coupled to the peak, follow and hold circuit 40. Thus, the amplitude detection and peak hold occurs for a positive pulse. It is now up to the control circuitry to control matters so that it is the first positive pulse that causes detection.

As indicated previously, the gates 130 and 131 pass the respective positive and negative pulses. These gates are enabled from the assertion output of the flip-flop 132. This flip-flop 132 is clocked from the output of the gate 104 by way of the inverter 134 and delay circuit 135. Thus, the gates 130 and 131 are enabled if the signals from the decoder 102 indicate either a tracking or amplitude sensing condition. The resetting of the flip-flop 132 is controlled by gates 136 and 137 to be discussed in detail hereinafter.

The output of the gate 131 which is low when a negative pulse is detected, is coupled by way of the gate 139 to the flip-flop 105. This negative pulse is passed by the gate 139 to cause a setting of the flip-flop 105. This generates the reset signal to the peak, follow and hold circuit for discharge of the capacitor in that measurements are not to be taken during the negative portion of the waveform, but instead during the positive portion. This action readies the peak, follow and hold circuitry for the positive pulses which will be coming in following the negative pulses. The switch remains open until after the A to D converter is through converting the analog signal into a digital number. The signals BUSY— from the A to D converter revert back to a high state and clock the flip-flop 105 which in turn closes the analog switch to discharge the capacitor to get ready for the next measurement. It is noted that the flip-flop 105 is clocked from the analog-to-digital converter 38 from its BUSY— signal which indicates that once the reading has been taken from the analog-to-digital converter, then the flip-flop 105 can be reset in readiness for detection of another negative pulse. This output from the analog-to-digital converter 38 also connects to the clock input of the flip-flop 140. The flip-flop 140 controls, by way of gate 108, the BUSY—/DONE signal which is coupled to the microcomputer 30. This is shown in FIGS. 11 and 12 by line 141 coupling by way of inverter 142 to the PB3 input of the microcomputer input 30. The line 141 represents one of the handshake lines previously referred to as lines 44 in FIG. 4.

The low level signal at the output of the gate 131 indicative of a negative pulse also couples to the flip flop 106 for causing a setting of this flip-flop. The negation output of the flip-flop 106 couples to gate 145 so as to enable gate 145 in readiness of receipt of the first positive pulse. Thus, after one or more negative pulses, when the first positive pulse is indicated at the output of the gate 130, this provides a low level signal at the output of gate 145 for clocking the device 150 which is a monostable multivibrator or one shot. The low level signal output at the negation output from one shot 150 selects the analog-to-digital converter by way of the gate 151 and essentially signals the converter that the converter is now to interpret an output from the peak, follow and hold circuit 40. Upon the occurrence of the positive pulse, the detection input is also coupled to the peak, follow and hold circuit enabling charging of the storage capacitor which tracks the signal waveform. It is noted that the operation of the one shot 150 also couples by way of the gates 136 and 137 to cause a resetting of the flip-flop 132 which then disables the gates 130 and 131 so that it is only the first positive pulse that is detected.

In a preferred embodiment of the invention the detection align may be eliminated, in that as opening the switch causes some operational problems. In this event the capacitor is allowed to charge after a negative pulse has been detected. The negative input voltage will have no effect since the circuit works only for positive input voltages. Thus the positive signal comes in after the negative one and charges the capacitor. The capacitor remains charged until the analog-to-digital converter is through reading the peak, follow and hold output. When the analog-to-digital converter is through, the capacitor is reset.

While the analog-to-digital converter 38 is converting the analog voltage, the flip-flop 140 is maintained reset indicating a busy condition on the output line 107. Under computer control, the read A/D signal on line 153 signals the converter to present the read data in digital form on the databus 36. This signal also couples to the gate 154 for causing a resetting of the flip-flop 140 to thus indicate a "not busy" signal by way of line 107, one of the handshake lines between the control circuitry and the microcomputer.

With regard to the measurement of tracking or head positioning, the output signals derived from a pre-recorded tracking tape are used. Again, reference can be made to FIG. 3 in the waveform shown therein. These waveforms consist of two positive peaks followed by two negative peaks of analog waveform. Only two consecutive peaks need to be measured to obtain position measurements; that is, either two positive or two negative peaks but not both. The tracking measurements are accomplished primarily by the computer. After the amplitude of the two peaks is measured and converted to digital data, the microcomputer 30 processes this information and provides a displacement reading in milli-inches or millimeters. These measurements can be made by a single reading or any desirable set of readings that can be averaged out.

With reference now to FIGS. 11 and 12, there is shown, in addition to the microcomputer 30, the display 48 and its associated drivers 160 which are interconnected by a connector 161. The drivers 160 receive data from the databus 36 by way of lines 162. The display 48 also receives other signals for controlling the type of display such as the signals P1, P2, P3, P5, DP2, DP3, and S. It is noted that most of these signals couple from the function decoder which includes a decoder 164 and a series of gates 165. Some of these signals are identified. For example, this signal P2 is representative of a velocity and is used to control the display to provide a proper type of velocity measurement. The signal P3 corresponds to tracking, the signal P5 corresponds to an amplitude rating and the signal P1 corresponds to a skew reading.

FIGS. 11 and 12 also illustrate the external controls 50 which include a series of four switches 50A corresponding to velocity, 50B corresponding to tracking, 50C corresponding to amplitude, and 50D corresponding to skew. One side of these signals couples to a DC line and the other side of all switches couple respectively to the four input control lines 166 associated with the microcomputer 30.

Also associated with the microcomputer 30 is a crystal oscillator 168 which is used for providing the proper timing functions for the microcomputer. Also are shown the four automatic gain selection signals P, R, S and T which couple to the circuitry of FIG. 5 described hereinbefore. There is also provided a memory 170 which may be of type 2516 and which is noted couples to the databus 36. The memory is conventionally associated with the microcomputer for the storage of programs.

The microcomputer also has a read/write output which couples to a gate 171 and a data strobe output which couples to both gate 171 and also gate 172. The read/write output also couples to output 172. The signals from these two gates are used to control additional gates such as the gate 174 used for the clocking of the command latch 100. Also, there are provided gates 175, 176, and 177 which are controlled from this read/write and strobe logic. It is noted that the outputs from the gates 175 and 176 are instrumental in the control of the up/down counter illustrated in FIG. 8. The output from the gate 177 controls the analog-to-digital conversion. This all occurs under computer control by way of the address latch 180 and associated address decoder 182. Note the lines coupling from the address decoder 182 to the respective gates 175-177.

In carrying out the measurements by means of the calibration meter of this invention, there are a number of different tapes that may be employed. A master head alignment or master skew tape is a standard that is used to check tape unit performance. Such a tape is recorded with the density of 800 flux changes per inch and is written with bits extending across the entire tape width. Total skew is usually held to within plus or minus 0.2 microseconds at 112.5 inches per second or plus or minus 22.5 microinches. Another tape is the master output tape which is a standard that is used to check and adjust the output or gain of the read amplifiers as well as adjust the right current or saturation level of the recording. When written to complete saturation, master output tapes produce amplitudes within plus or minus 2% of the NBS master standard tape. A velocity tape is a pre-recorded tape with 800 bits per inch, NRZI all ones, with continuous motion on a tape drive with constant velocity within plus or minus 0.1% deviation. This tape is used to check the velocity of the tape drive.

Figure 13:
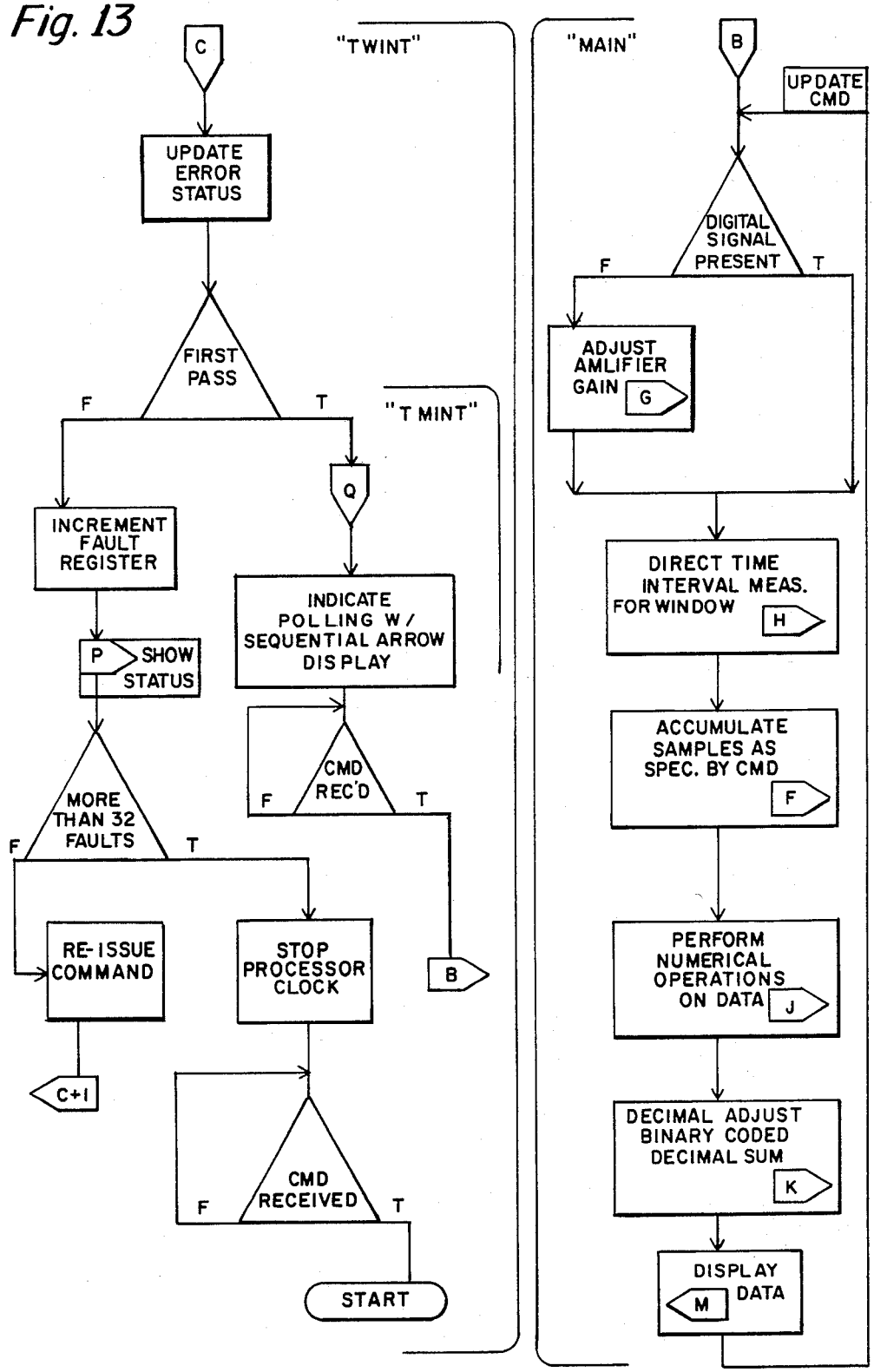
FIGS. 13 and 14 are flow charts describing the calibration program.
Figure 14:
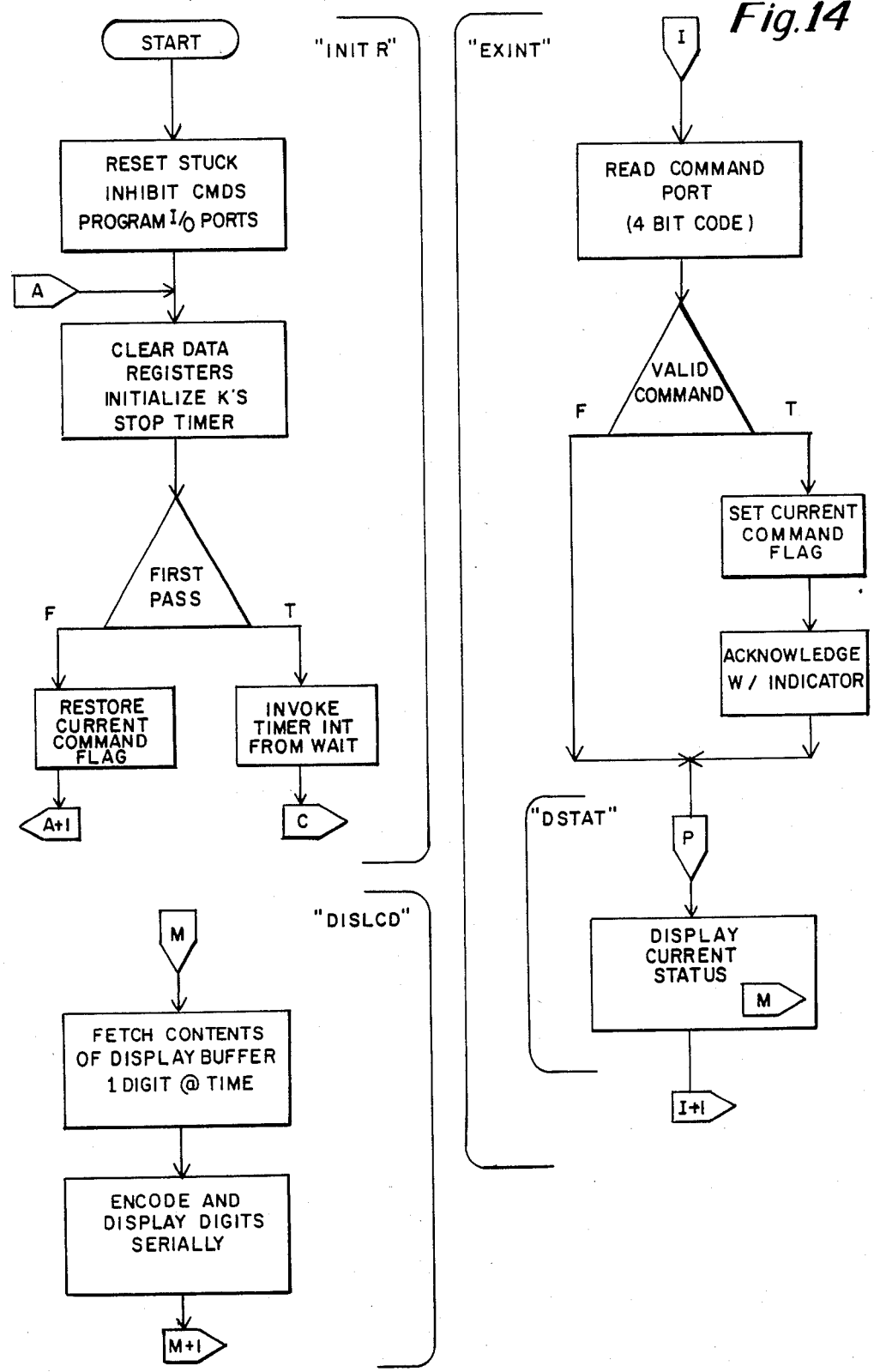

The following is a description of the tape calibration program. This description is associated with the flow charts shown in FIGS. 13 and 14. The code contained in read only memory for the tape drive calibrator has been arranged to direct the microprocessor through the operations of signal conditioning, measurement and interpretation. The normal course of program flow is restricted to repeated passes through "main" conditioning, sampling, processing and displaying signal data.

A normal course requires proper connection of the calibrator to a valid signal source. The signal reaching internal circuitry would be large as compared to "random" noises present and periodic.

The processor has been programmed to start from power up at "initr". This routine performs basic housekeeping chores necessary for sustained operation. It contains a subsequence (A) used to reinitialize most of the dynamic memory for use at the beginning of "samplr". The "I" mask or interrupt mask is used here to distinguish between points of entry. At power up the mask is set, disallowing operator commands until the calibrator is ready. With the "I" mask set program flow has been directed to the polling routine present in "TMINT"(C Q). "TMINT" cycles through the commands available to the operator, displays the appropriate indicators, inviting command.

Commands are handled through "EXINT"(I). This routine operates on a double buffering principle, new command current command, since commands may occur at many different points of program execution. The new command indicator displayed with the current status through "DSTAT"(P), recognizing the operator. Since this is an interrupt routine program execution resumes at the point of interruption and the new command is acknowledged during the subsequent pass through "MAIN".

"MAIN"(B) is the working loop of data aquisition and display. If a digital signal is indicated then adjustment of amplifier gain in "AGC"(G) is unnecessary. "TWNDOW"(H) is now executed to obtain the binary count associated with a one-quarter period interval. This count is retained as an upper limit for valid skew data.

"SAMPLR"(F) is executed next, accumulating samples as directed by the current command. "SAMPLR" contains means for error checking and a random sampling interval. Two hundred and fifty six measurements are taken with a running total maintained in dynamic memory.

"DAPROC"(J) follows in the sequence of "MAIN". Accumulated data is operated upon under one of four functions and the result is examined for binary weights. A binary coded decimal sum is built with decimal adjustment of addition being performed by "DACONV"(K). The entire routine is tailored to handle the range of values expected as data.

Upon return to "MAIN" a final decimal adjustment is performed and the BCD result screened to eliminate nonsensical values. "DISLCD"(M) takes the adjusted value, encodes for output and outputs to the display port. Finally "MAIN" updates the current command register and examines the fault register. In the normal sequence program flow is redirected to the beginning of "MAIN"(B).

Errors are handled by the timer interrupt routines. Errors are retried with a timing restriction. Repeated failures are tallied in the fault register with thirty two being the allowable maximum. Either the fault count or system status is displayed through "DSTAT"(P) each time the error sequence is performed. If the maximum number of faults have been accumulated the display counts down until the fault register reaches zero. Here the processor stops awaiting operator command. Any command will cause reinitialization at "INITR".

Having described one embodiment of the present invention, it should now be apparent to those skilled in the art that numerous other embodiments are contemplated as falling within the scope of this invention.

What is claimed is:

1. A tape drive calibration meter for displaying any one of a number of different parameters to be calibrated comprising;
   input circuit means defining first and second signal channels each receiving a detected signal from a read head associated with the tape drive,
   time interval measurement means coupled from said input circuit means and including means for providing a digital signal representative of the time difference between signals on the first and second signal channels,
   peak amplitude detection means coupled from said input circuit means and including means for providing a digital signal representative of peak amplitude of a signal on one of said signal channels,
   and data processing and display means receiving said time difference digital signal and said peak amplitude digital signal and displaying numbers representative of time difference and peak amplitude.

2. A tape drive calibration meter as set forth in claim 1 wherein said input circuit means includes first channel amplifier means and second channel amplifier means.

3. A tape drive calibration meter as set forth in claim 2 including gain control means coupled from said data processing and display means to both said amplifier means.

4. A tape drive calibration meter as set forth in claim 2 further including peak detector means associated with each said channel and coupling from said amplifier mans to said time interval measurement means.

5. A tape drive calibration meter as set forth in claim 4 wherein said peak detector means comprises differentiator means coupling to a squaring circuit.

6. A tape drive calibration meter as set forth in claim 5 including monostable vultivibrator means coupled from said squaring circuit to provide a pulse input to said time interval measurement means.

7. A tape drive calibration meter as set forth in claim 1 wherein said time interval measurement means comprises first logic means for detecting phase difference between said channels.

8. A tape drive calibration meter as set forth in claim 7 including up-down counter means and means responsive to one phase for controlling counting up and responsive to the opposite phase for controlling counting down.

9. A tape drive calibration meter as set forth in claim 7 further including second logic means for generating a time window signal the width of which is representative of time difference between the first and second channel signals.

10. A tape drive calibration meter as set forth in claim 9 further including counter means responsive to a clock and said time window signal for generating a series of clock pulses and up-down counter means clocked by said series of clock pulses, the final output of said up-down counter means being a digital signal representative of time difference.

11. A tape drive calibration meter as set forth in claim 10 including velocity logic means including means defining a velocity time interval window, said counter means being responsive to said clock and said velocity time interval signal for generating a series of clock pulses, the final output of said up-down counter means in the velocity state of operation being a digital signal representative of velocity.

12. A tape drive calibration meter as set forth in claim 11 wherein said second logic means includes exclusive OR means.

13. A tape drive calibration meter as set forth in claim 1 wherein said peak amplitude detection means comprises peak follow and hold means for providing a voltage signal indicative of peak voltage.

14. A tape drive calibration meter as set forth in claim 13 including analog-to-digital conversion means responsive to the peak voltage for providing said digital signal representative of peak amplitude.

15. A tape drive calibration meter as set forth in claim 14 wherein said peak follow and hold means includes amplifier and rectifier means and capacitor storage means, the charging and discharging of said capacitor storage means being under control of said data processing and display means.

16. A tape drive calibration meter as set forth in claim 15 including logic control means for controlling detection to sample the same detected head signal each cycle so as to enable proper amplitude comparisons.

* * * * *